March 10, 1970     V. E. NEEDHAM     3,499,365
ROUTER PLANES
Filed Sept. 27, 1965
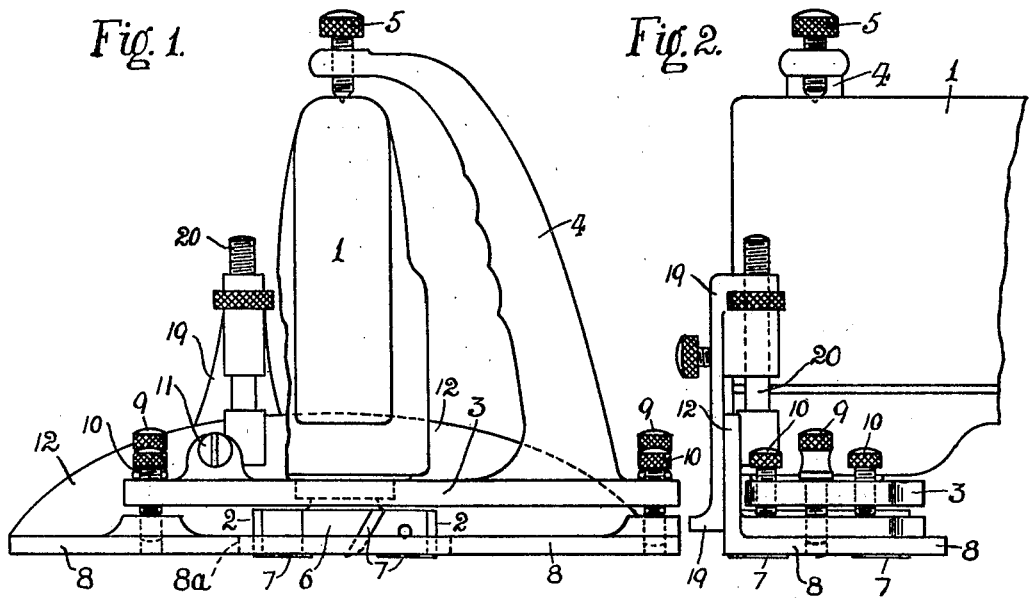
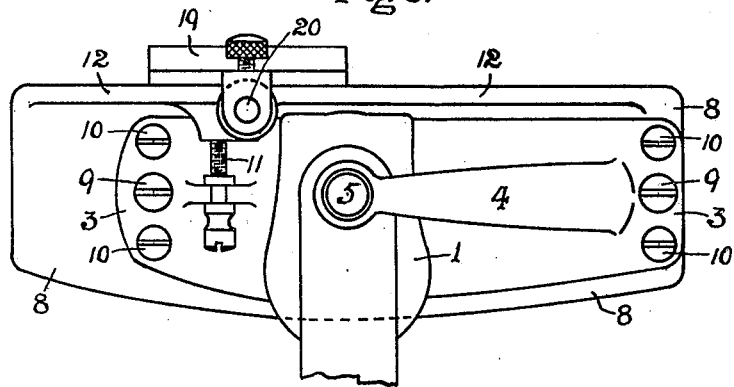
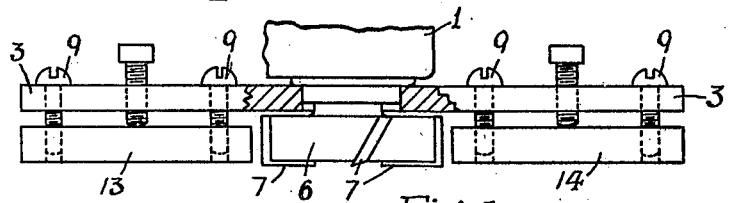
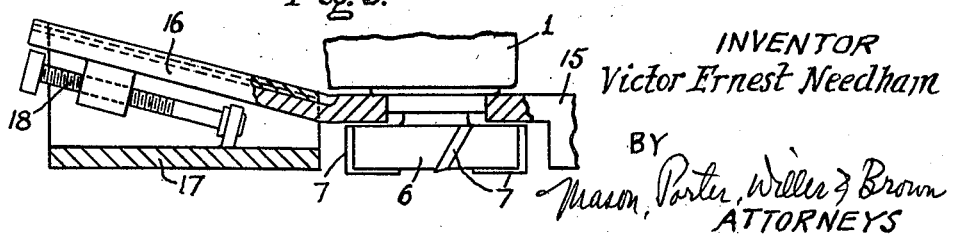
INVENTOR
Victor Ernest Needham United States Patent Office 3,499,365
Patented Mar. 10, 1970

3,499,365
ROUTER PLANES
Victor E. Needham, 69 Gertrude Road,
West Bridgford, Nottingham, England
Filed Sept. 27, 1965, Ser. No. 490,603
Int. Cl. B23d 41/02, 41/04; B27c 5/10
U.S. Cl. 90—12                                    10 Claims

ABSTRACT OF THE DISCLOSURE

A router plane is disclosed having a base plate upon which is detachably mounted a motor and below which is disposed a sole plate adjustable with respect to the base plate to regulate the depth of cut. A handle portion is connected to the base plate and extends upwardly therefrom and into overlying relationship with the motor. The overlying portion of the handle is interconnected with the motor and forces the motor downwardly into firm seating engagement with the base plate.

A cutter is disposed in an opening in the sole plate and the sole plate may be of one piece or two-piece construction adjustable on each side of the cutter.

Alternatively, the sole plate may be connected to an upwardly sloping portion of the base plate for sliding movement therealong.

---

This invention relates to router planes and its object is to provide a router plane which is manually operated and provided with an electric motor driven rotary cutter, the motor being either permanently fixed in position or detachable so that a portable electric motor normally used for drilling and similar purposes can be fixed in position to drive the cutter.

According to this invention a router plane comprises a base on which the motor and rotary cutter are mounted with the axis of the cutter vertical or near vertical to a sole plate disposed under the base and having an opening therein in which the cutter is located, the sole plate being attached to the base so that it can be adjusted relatively thereto to regulate the depth of cut. The sole plate may be made in two separate parts which are independently adjustable relatively to the base, one part being disposed in front of the cutter and one behind. Adjustable lays are also preferably provided to control the depth and width of rebates cut with the plane. The sole plate may be constructed so that the leading end thereof is adjustable independently of the rear end.

The invention will now be more particularly described with reference to the accompanying drawings in which:

FIG. 1 is a side elevation
FIG. 2 an end elevation and
FIG. 3 a plan of a router plane constructed according to this invention
FIG. 4 is a side elevation showing a divided sole plate and
FIG. 5 is a side elevation showing a further alternative form of sole plate.

Like numerals indicate like parts throughout the drawings.

In carrying out this invention the motor 1 for driving a rotary cutter 2 is mounted with its spindle vertical or substantially vertical on a base 3, the motor spindle projecting through the base 3. The motor 1 can be of portable drill type, and there must also be a handle for the plane. For these two purposes there is secured on the base 3 an arm 4. For said first purpose the arm 4 extends to an upper location over the motor and it is there provided with a set screw 5 to engage with the upper end of the motor 1 and hold the motor in position on a seat on the base 3. For said second purpose the same arm 4 is provided in the form of a handle as shown in FIGURE 1. The cutter 2 is secured to the motor spindle in any convenient manner and the cutter is a face cutter and comprises a boss 6 having a plurality of radially disposed removable cutters 7 secured therein.

Disposed below the base 3 is a sole plate 8 having an opening 8a therein in which the cutter 2 is located. The sole plate 8 is attached to the base 3 so that it can be adjusted towards or away from the base 3 for adjusting the depth of cut and also laterally thereof for a similar purpose. For this purpose the sole plate 8 is attached to the base 3 by a plurality of screws 9 which pass through clearance holes in the base 3 and screw into holes in the sole plate 8 and the latter is held rigid when set in the required position by a plurality of set screws 10 in the base 3 which are screwed into engagement with the upper face of the sole plate 8. The sole plate 8 is set so that the cutting edges of the cutter blades 7 project the required distance below the under surface of the sole plate 8, according to the depth of cut required. The sole plate 8 is moved laterally of the cutter by one or more adjusting screws 11 mounted on the base 3 and engaging with a flange 12 on the upper side of the sole plate 8 and disposed along one edge thereof.

The sole plate 8 may be made in two parts, as shown in FIG. 4, one part 13 located in front of the cutter 2 and one part 14 behind the cutter. Each part is attached to the base 3 and is adjustable relatively thereto, independently of the other part by adjusting screws 9. Alternatively as shown in FIG. 5 the rear part 15 of the sole plate may have a forward extension 16 which is inclined upwardly and the front part 17 of the sole plate be slidingly mounted on this forward and upward extension 16 and be adjusted thereon by an adjusting screw 18.

The cutter comprises a boss 6 with a plurality of radial cutting edges thereon. The cutting edges are disposed horizontally and vertically and are conveniently formed on blades 7 secured in slots in the boss 6. The blades 7 are removable for ease in sharpening and may be adjustably mounted in the slots. The blades may have tungsten carbide tipped cutting edges for use on hard material. The blades 7 are made of suitable material and may be of pressed steel.

A suitable lay 19 on a pillar 20 is provided on the sole plate 8 to regulate the depth of rebates cut by the plane and a lay is provided on the base to regulate the width of rebates. A router plane such as described requires little effort to use having a motor driven cutter and can be used for cutting rebates or for surfacing material.

What I claim is:
1. A router plane comprising a base plate, a motor mounted on said base plate and having a substantially vertical spindle extending through an opening in said base plate, a sole plate mounted under said base plate and having an opening formed therein, a cutter mounted on said spindle and located within said sole plate opening, said base plate being in overlying relation to said sole plate, first and second interconnecting means located on opposite sides of said opening in said base plate for interconnecting said base plate and said sole plate and for lockably adjusting the position of said sole plate with respect to said base plate, and said motor is mounted on the base plate with its spindle substantially at right angles to the base plate and is held on a seat on the base plate by a set screw in the end of an arm on the base plate engaging with the end of the motor.

2. A router plane comprising a base plate, a motor mounted on said base plate and having a substantially vertical spindle extending through an opening in said base plate, a sole plate mounted under said base plate and having an opening formed therein, a cutter mounted on said spindle and located within said sole plate opening, said base plate being in overlying relation to said sole plate, first and second interconnecting means located on opposite sides of said opening in said base plate for interconnecting said base plate and said sole plate and for lockably adjusting the position of said sole plate with respect to said base plate, and the sole plate is formed in two parts located one on each side of the cutter and each part of the sole plate is attached to the base plate by said first and second interconnecting means to allow adjustment of each of said two parts relatively to said base to regulate the depth of cut.

3. A router plane comprising a base, a motor mounted on said base and a sole plate disposed under said base, said motor having a spindle and a cutter mounted on said spindle, said cutter being located in an opening in said sole plate, screw means adjustably connecting said base to said sole plate and engaging in holes formed in said sole plate, and set screw means in said base and engaging the upper side of said sole plate.

4. A router plane according to claim 3 wherein said sole plate comprises two parts, said screw means and said set screw means adjustably interconnecting each of said two parts to said base.

5. A router plane comprising a base plate, a motor mounted on said base plate and having a substantially vertical spindle extending through an opening in said base plate, a sole plate mounted under said base plate, a cutter member on said spindle and located within an opening in said sole plate, a handle extending upwardly from said base plate and attached thereto, an upper portion of said handle being in overlying relationship to said motor and having means interconnecting said handle and said motor for forcing said motor into firm engagement with said base plate.

6. In a router plane the combination comprising a base plate, a sole plate mounted under said base plate, adjustable screw means for attaching said sole plate to said base plate for relative adjustment therebetween, an opening in said base plate for a vertical motor spindle, an opening in said sole plate for a cutter on the vertical motor spindle, seat means on said base for locating one end of the motor having the spindle and cutter, a handle extending upwardly from said base plate and attached thereto, an upper portion of said handle being in overlying relationship to the motor, and having means for interconnecting the handle and the motor for forcing the motor into firm engagement with the base plate.

7. The combination as defined in claim 6 including a motor having a vertical spindle carrying a cutter, and said motor is held between said seat means and said interconnecting means.

8. The combination as defined in claim 6 in which the base plate has an upwardly inclined forward extension and the front part of the sole plate is slidingly mounted thereon and is adjusted relatively thereto by a screw.

9. The combination as defined in claim 6 in which the cutter comprises a boss having radially disposed cutting blades detachably mounted therein.

10. The combination as defined in claim 6 including adjustable blades on the base for limiting the depth and width of rebates.

References Cited
UNITED STATES PATENTS

| | | | |
|---|---|---|---|
| 1,281,207 | 10/1918 | Richens | 145—5 |
| 1,565,790 | 12/1925 | Carter | 90—12 |
| 1,641,645 | 9/1927 | Skolnik | 145—4 |
| 1,706,157 | 3/1929 | Hannah | 145—4 |
| 2,395,158 | 2/1946 | Yandell | 145—4 |
| 2,649,873 | 8/1953 | Reich et al. | 145—5 XR |

LEONIDAS VLACHOS, Primary Examiner

U.S. Cl. X.R.

144—134; 145—4